Patented Oct. 16, 1951

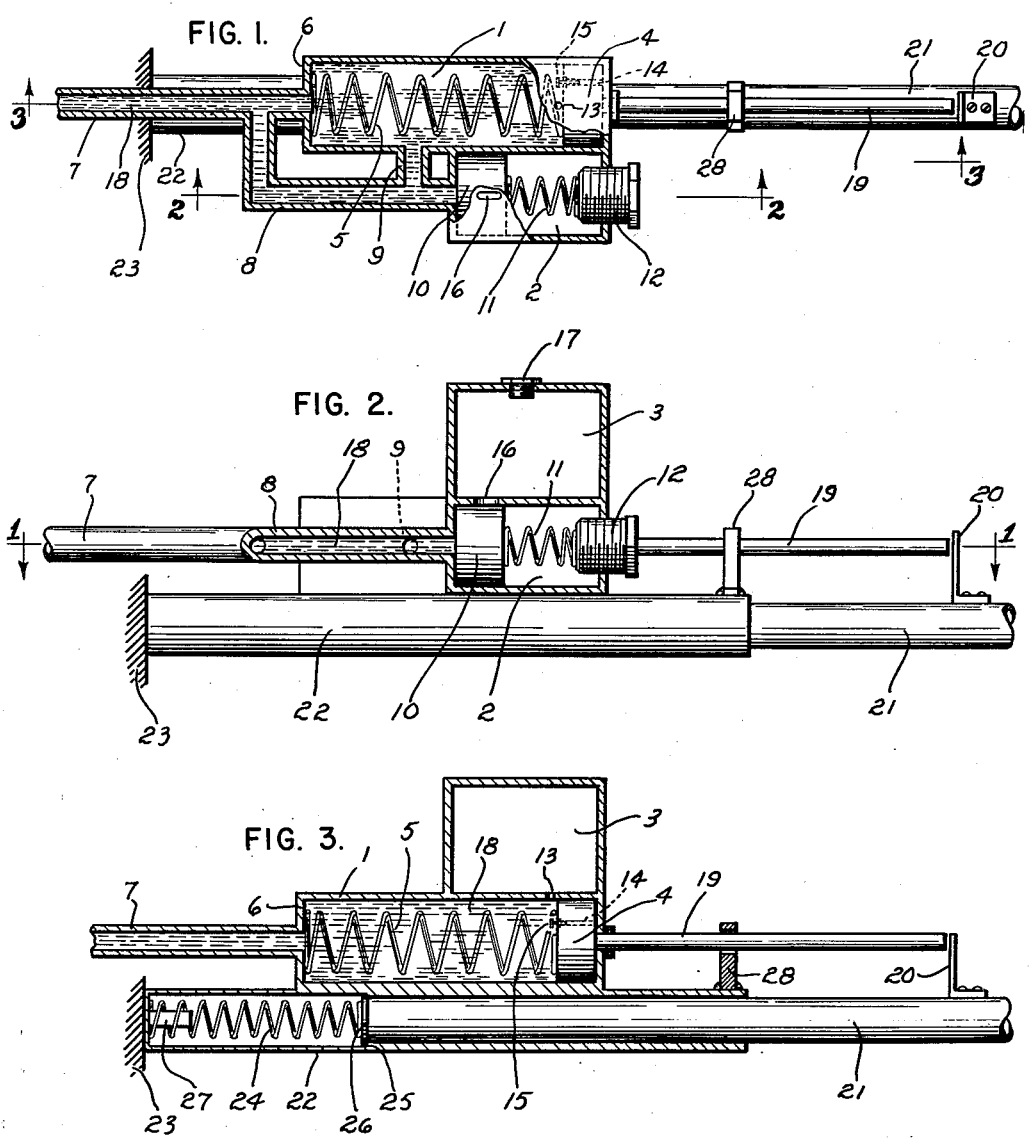

2,571,323

UNITED STATES PATENT OFFICE 2,571,323

TOW BAR BRAKE CONTROL

Herbert G. Yoder, Bellefontaine, Ohio

Application August 2, 1946, Serial No. 687,833

10 Claims. (Cl. 188—112)

This invention relates to a trailer brake control, and more particularly, to an automatic control device for effectively braking trailers.

The problem of braking trailers drawn by vehicles has long been recognized. Complicated braking systems have been devised but my invention relates to a simple, safe and efficient control for stopping a trailer when the power vehicle is braked. It is therefore a major object of this invention to provide an automatic brake control device which applies the trailer brakes efficiently and with great safety as soon as the power vehicle brakes are applied.

It is another object of this invention to provide for an improved trailer brake control embodying a brake fluid which is utilized to apply the trailer brakes by means of a piston controlled from the power vehicle.

A further object of this invention is to provide an improved automatic brake control for trailers including a series of fluid chambers mounted on the trailer and a piston mounted on the vehicle and reciprocable in one of the fluid chambers so that when the vehicle is braked, relative movement between the chambers and the piston will cause the trailer brakes to be applied.

Still another object of this invention is to provide an improved automatic brake control for trailers which is initiated by relative movement between the trailer and the power vehicle and which includes means permitting the trailer to be reversed with the trailer brakes released.

Other objects of this invention will appear from the following specification and claims and from the accompanying drawing illustrating the invention, wherein:

Figure 1 is a plan view, partly in section taken on line I—I of Figure 2;

Figure 2 is an elevational view, partly in section, taken on line II—II of Figure 1; and Figure 3 is a sectional view taken on line III—III of Figure 1.

Referring to the drawing, the brake control device of this invention comprises a master brake cylinder 1 and a safety release chamber 2, positioned side by side. Immediately over the master brake cylinder 1 and safety release chamber 2, and coextensive therewith in a transverse direction, is a reservoir chamber 3. The master brake cylinder 1 is provided with a piston 4 and a coil spring 5 interposed between the piston 4 and the rear wall 6 of the cylinder. A pipe 7 leads from the rear of cylinder 1 to the wheel brake cylinders (not shown) of the trailer. An L-shaped pipe 8 connects pipe 7 with the rear end of the safety release chamber 2. A short pipe 9 connects pipe 8 with master brake cylinder 1 as clearly shown in Figure 1.

The safety release chamber 2 is provided with a piston 10, urged rearwardly by means of a coil spring 11, the tension of which is adjustable by means of a screw 12, threaded into the forward wall of the release chamber 2.

Orifice 13, shown in Figures 1 and 3, interconnects the master brake cylinder 1 and the reservoir chamber 3 at a point immediately to the rear of the piston 4 when in its forward position, as shown in the figures. An orifice 14 extends through the piston 4 and is controlled by the one-way valve 15. An elongated orifice 16 interconnects the safety release chamber 2 with the reservoir chamber 3, for a purpose to be described hereinafter. A filler plug 17 is positioned at the top of the reservoir chamber 3 for adding brake fluid 18 to the system.

The piston 4 is provided with the piston rod 19, extending forwardly and with its extremity positioned slightly to the rear of an L-shaped bracket member 20, fastened to the sliding hitch member 21, fixed at its forward end (not shown) to the power vehicle (not shown) which pulls the trailer. The sliding hitch member 21 telescopes into its complemental hitch member 22, fixed to the trailer 23. A coil spring 24 in hitch member 22 cushions hitch member 21. A stop 25 on hitch member 22 cooperates with a flange 26 formed on the end of hitch member 21 to limit forward movement of member 21. A bumper 27 is provided at the rear end of hitch member 22 to stop hitch member 21 in its rearward travel. A guide 28, fixed on hitch member 22, guides piston rod 19 in its reciprocating movement.

Spring 24, it may be noted, is fairly stiff and will normally hold the hitch extended as shown in the drawings and will even, preferably, so hold the hitch when the trailer is being backed up on smooth level ground.

In operation when the power vehicle that is pulling the trailer is braked, the hitch member 21 and bracket 20 thereon will slow down with the vehicle. The momentum of the trailer will cause piston rod 19 to strike bracket 20 and force piston 4 to move rearwardly in the master brake cylinder 1 against the yielding pressure of spring 5. This action of piston 4 will cause brake fluid 18 to be forced through pipe 7 to the wheel brake cylinders (not shown) of the trailer to cause application of the trailer brakes almost immediately with the application of the vehicle brakes. The amount of pressure being applied to the trailer brakes will vary with the momentum of the trailer and the brake pressure applied on the vehicle. A quick stop of the vehicle or a large trailer momentum will cause a quick rearward movement of the piston 4 with a heavy pressure on the brake fluid. Thus the brake fluid pressure required will be automatically regulated as required. The distance that the piston 4 can travel in cylinder 1 is determined by the distance that hitch member 21 can travel in hitch member 22, i. e., the distance between bumper 27 and stop 25.

The brake control of this invention enables the vehicle and trailer to be reversed without being impeded by the trailer brakes. In one case, as set forth above, the spring 24 sustains the backing-up thrust. In other cases, as when backing uphill, or on rough ground, or when the trailer is heavily loaded, the piston 4 will move backwardly to force the brake fluid 18 rearwardly. Fluid pressure in pipe 8 will set the brakes of the trailer and then will force piston 10 forwardly in the safety release chamber 2 until the piston 10 passes orifice 16. This will allow brake fluid 18 to pass through orifice 16 thus permitting further rearward movement of piston 4. An absolute release in pressure takes place when piston 4 passes pipe 9 by permitting the brake fluid to pass, via pipes 7, 8, and 9 into the space in front of piston 4. Backing of the trailer can now take place without hindrance from its brakes and as long as the towing vehicle is not moved forwardly relative to the trailer, the trailer brakes will remain released, it being apparent that springs 11 and 5 even acting together are not strong enough to move the trailer and towing vehicle apart. Even when the towing vehicle and trailer are moved apart, as by the towing vehicle moving forwardly, the trailer brakes do not become immediately operative again. This is due to the restricted passage 14 in piston 4 which delays its return to its right hand position. While it will be evident that piston 10 only becomes operative when the brake fluid pressure becomes fairly high and moves it a predetermined amount, this piston nevertheless can act as a cushion to relieve sudden pressure surges on the brake fluid. This smoothes out the operation of the trailer and, in combination with spring 24, stabilizes the action of the trailer.

The escaping fluid, passing through orifice 16, will enter the reservoir chamber 3. Thus with the brakes released the trailer will be free to be reversed. The fluid in the reservoir chamber returns to the master brake cylinder 1 through orifice 13 to a position between the piston 4 and the forward wall of the cylinder 1. Then after reversing is completed, when the vehicle goes forward again the piston 4 will be returned to its forward rest position, as shown in the figures, by means of the coil spring 5. During the return travel of piston 4 to its forward rest position all fluid forwardly of piston 4 will return to its normal position behind piston 4 by means of orifice 14 and valve 15.

The pressure necessary to cause piston 10 to pass orifice 16 to release brake pressure may be adjusted by screw 12, depending on the load and weight of the trailer. The adjustment should be such that the pressure normally developed by piston 4 will only apply the trailer brakes and pressure greater than normal will be required to force piston 10 past orifice 16.

By having piston rod 19 separate from bracket 20 one is permitted to back the trailer a very short distance, as in straightening the trailer or for some other reason, without fully applying the brakes, the spring 24 functioning at this time as above described. Also this construction enables forward drive without pulling on the brake piston 4. The piston 4 will return to its forward position by means of the spring 5.

The size of the various orifices can be varied depending on the trailer capacity and other factors. The orifice 16, as shown, is preferably elongated so that the harder the pressure on the fluid by the piston 4, the greater will be the movement of piston 10, and more of orifice 16 will be exposed, allowing rapid release of fluid from the brake system to permit further movement of piston 4.

After backing of the towing vehicle and trailer, as described above, and at which time the piston 4 is between conduits 8 and 9 so that the trailer brakes are exhausted to reservoir 3, if the towing vehicle again moves forward, as when straightening out the trailer for further backing, the piston 4 does not immediately return to its working position. Rather, due to the restrictions of the various passages 13, 14 and the valve 15, the return of the piston 4 to the right-hand end of the cylinder 6 (Figure 1) after the conduit 9 is covered, is delayed for a period of, say, ten to fifteen seconds. This delay permits backing of the trailer to be resumed without going through the complete process of releasing its brakes and greatly contributes to the ease of manipulating a trailer when employing an automatic brake actuator of the general type shown in this application.

While a certain specific embodiment of this invention has been shown, it will be understood that various modifications may be made within the spirit of the invention. Therefore no limitations on the invention are intended other than are imposed by the scope of the appended claims.

I claim:

1. A trailer brake control device for attachment between a trailer and a power vehicle comprising, a slidable hitch and a brake fluid system; said brake fluid system comprising a master brake cylinder, means for interconnecting the trailer wheel brakes and the master brake cylinder, a piston in said master brake cylinder and a spring normally urging said piston toward inoperative position, a rod abutting said piston and extending out the end of the master brake cylinder, a reservoir having a connection with said master cylinder immediately ahead of the inoperative position of said piston, said slidable hitch including a pair of telescopically connected members, one of which is adapted for connection with the trailer and the other of which is adapted for connection with the power vehicle; said master brake cylinder being mounted on one of said members and there being means on the other member for actuating said rod to move said piston when said members are moved toward each other; spring means urging said members apart with a thrust sufficient to permit backing of said trailer on a level smooth surface without movement of said members toward each other; and means responsive to a predetermined pressure on the fluid in said system greater than that required for setting the brakes of the trailer for connecting the brake side of the said piston with the reservoir and thereby by-passing the brake fluid from said master brake cylinder to the reservoir.

2. A trailer brake control device for attachment between a trailer and a power vehicle comprising, a slidable hitch and a brake fluid system; said brake fluid system comprising a master brake cylinder and a reservoir, means for interconnecting the trailer wheel brakes and the master brake cylinder, a by-pass channel between said means and said reservoir and a valve normally closing said channel, a piston in said master brake cylinder and a spring normally urging said piston toward inoperative position, a rod abutting said piston and extending out the end of the master brake cylinder, said reservoir having a connection with said master cylinder immediately ahead of the inoperative position of said piston, said slidable hitch including a pair of telescopically connected members, one of which is adapted for connection with the trailer and the other of which is adapted for connection with the power vehicle; said master brake cylinder being mounted on one of said members and there being means on the other member for actuating said rod to move said piston when said members are moved toward each other; spring means urging said members apart with a thrust sufficient to permit backing of said trailer on a level smooth surface without movement of said members toward each other; and means responsive to a predetermined pressure on the fluid in said system greater than that required to set the brakes of the trailer for moving said valve to its open position for by-passing fluid from said master brake cylinder to the reservoir.

3. A trailer brake control device for attachment between a trailer and a power vehicle comprising a slidable hitch and a brake fluid system; said brake fluid system comprising a master brake cylinder, conduit means for interconnecting the trailer wheel brakes and the master brake cylinder, a piston in said master brake cylinder and a spring normally urging said piston toward inoperative position, a rod abutting said piston and extending out the end of the master brake cylinder, a reservoir having a connection with said master cylinder immediately ahead of the inoperative position of said piston, said slidable hitch including a pair of telescopically connected members, one of which is adapted for connection with the trailer and the other of which is adapted for connection with the power vehicle; said master brake cylinder being mounted on one of said members and there being means on the other member for actuating said rod to move said piston when said members are moved toward each other; spring means urging said members apart with a thrust sufficient to permit backing of said trailer on a level smooth surface without movement of said members toward each other; a release chamber connected to said conduit means and having an orifice opening into said reservoir, a second piston in said chamber normally covering said orifice, and means responsive to a predetermined pressure on the fluid in said conduit means greater than that required to set the brakes of the trailer for moving said second piston into position to uncover said orifice and thereby to by-pass fluid from said conduit means to the reservoir.

4. A trailer brake control device for attachment between a trailer and a power vehicle comprising a slidable hitch and a brake fluid system; said brake fluid system comprising a master brake cylinder, conduit means for interconnecting the trailer wheel brakes and the master brake cylinder, a piston in said master brake cylinder and a spring normally urging said piston toward inoperative position, a rod abutting said piston and extending out the end of the master brake cylinder, a reservoir having a connection with said master cylinder immediately ahead of the inoperative position of said piston, said slidable hitch including a pair of telescopically connected members, one of which is adapted for connection with the trailer and the other of which is adapted for connection with the power vehicle; said master brake cylinder being mounted on one of said members and there being means on the other member for actuating said rod to move said piston when said members are moved toward each other; spring means urging said members apart with a thrust sufficient to permit backing of said trailer on a level smooth surface without movement of said members toward each other; a release chamber connected to said conduit means and having an elongated orifice opening into said reservoir, a second piston in said chamber normally covering said orifice, means responsive to a predetermined pressure on the fluid in said means greater than that required to set the brakes of the trailer for moving said second piston into position to uncover said orifice thereby to by-pass the fluid being displaced by the piston in the brake cylinder to exhaust, and a channel connecting said release chamber with a point on said brake cylinder positioned to be uncovered by the piston therein upon a predetermined further amount of movement thereof after movement of said second piston to fluid releasing position, said channel providing for complete and unrestricted release of pressure from said trailer brakes.

5. A trailer brake control device for attachment between a trailer and a power vehicle comprising a slidable hitch and a brake fluid system; said brake fluid system comprising a master brake cylinder, conduit means for interconnecting the trailer wheel brakes and the master brake cylinder, a piston in said master brake cylinder and a spring normally urging said piston toward inoperative position, a rod abutting said piston and extending out the end of the master brake cylinder, a reservoir having a connection with said master cylinder immediately ahead of the inoperative position of said piston, said slidable hitch including a pair of telescopically connected members, one of which is adapted for connection with the trailer and the other of which is adapted for connection with the power vehicle; said master brake cylinder being mounted on one of said members and there being means on the other member for actuating said rod to move said piston when said members are moved toward each other; spring means urging said members apart with a thrust sufficient to permit backing of said trailer on a level smooth surface without movement of said members toward each other; a release chamber connected to said conduit means and having an elongated orifice opening into said reservoir, a second piston in said chamber normally covering said orifice, means responsive to a predetermined pressure on the fluid in said means greater than that required to set the brakes of the trailer for moving said second piston into position to uncover said orifice thereby to by-pass the fluid being displaced by the piston in the brake cylinder to exhaust, and a first channel connecting said release chamber with a point on said brake cylinder positioned to be uncovered by the piston therein upon a predetermined further amount of movement thereof after movement of said second piston into fluid releasing position, said first channel providing for complete and unrestricted release of pressure from said trailer brakes, and restricted channel means for releasing the fluid from the space in said brake cylinder behind the piston as the latter returns and again covers said first channel.

6. In combination in a coupling for a trailer having brakes comprising; a slidable hitch having one part to be secured to said trailer and another part to be secured to a power vehicle; spring means urging said parts away from each other, fluid displacement means carried by said hitch and responsive to movement of said parts toward each other for displacing fluid; conduit means for connecting the trailer brakes with the fluid displacement means for actuating said trailer brakes by the displaced fluid; a reservoir; means responsive to a predetermined pressure developed in said displaced fluid greater than the pressure required to set the trailer brakes for by-passing the displaced fluid away from said brakes to said reservoir to permit further movement of said parts towards each other; and other means responsive after a predetermined movement of said parts toward each other for effecting unrestricted release of said trailer brakes.

7. In a hydraulic brake actuating device; a reservoir; a master cylinder having a piston therein spring urged toward one end thereof and movable to displace fluid from the cylinder; a port opening from the reservoir to a point in said cylinder immediately ahead of said piston when the latter is at rest at the said one end of the cylinder; pressure responsive means connected with the other end of said cylinder and operable in response to a predetermined pressure therein to exhaust fluid therefrom to said reservoir; another connection between said pressure responsive means and a point in said cylinder spaced from said other end a distance greater than the length of said piston; and means for releasing the fluid entrapped between said piston and the said one end of said cylinder when the piston returns toward its idle position.

8. In a hydraulic brake actuating device; a reservoir, a master cylinder having a part connected with said reservoir adjacent one end of the cylinder, a piston in said cylinder spring urged toward said one end and beyond said port; pressure responsive means connected with the other end of said cylinder and operable in response to a predetermined pressure therein to exhaust fluid therefrom to said reservoir; another connection between said pressure responsive means and a point in said cylinder spaced from said other end a distance greater than the length of said piston; a restricted passage in said piston for returning fluid from one side thereof to the other as it returns toward its idle position, and means extending through the said one end of said cylinder for actuating said piston.

9. In combination in a hitch for use between a trailer having brakes and a towing vehicle comprising; a collapsible hitch having one part adapted for being secured to the trailer and another part adapted for being secured to the power vehicle, means predetermining an extended position of said hitch and means resisting movement of said parts toward each other until a predetermined thrust has been developed thereon; fluid displacement means carried by said hitch and responsive to movement toward each other of said parts for displacing fluid, said means including means for conveying the displaced fluid therefrom for effecting actuation of the trailer brakes; a reservoir; means responsive to a predetermined pressure developed on said displaced fluid greater than the pressure required thereon to set the trailer brakes for by-passing the displaced fluid to said reservoir; and other means responsive to a predetermined movement of the parts of said hitch toward each other for effecting a substantially unrestricted connection of said displaced fluid with said reservoir.

10. In combination in a hitch for use between a trailer having brakes and a towing vehicle comprising; a collapsible hitch having one part adapted for being secured to the trailer and another part adapted for being secured to the power vehicle, abutments on said parts predetermining a maximum extended position of the hitch, a spring between said parts urging them towards their extended position with a thrust that will prevent collapsing of the hitch under normal backing conditions, means carried by the parts of said hitch and responsive to movement toward each other of said parts for energizing the brakes of the trailer to a degree which is proportional to the amount of movement of said parts toward each other, means for allowing movement of said parts toward each other after said trailer brakes have been applied, and means responsive to a predetermined movement of said parts toward each other after the brakes of the trailer have been set for de-energizing the trailer brakes.

HERBERT G. YODER.

REFERENCES CITED

The following references are of record in the file of this patent:

UNITED STATES PATENTS

| Number | Name | Date |
|---|---|---|
| 1,457,156 | Frock | May 29, 1923 |
| 1,881,185 | Hazelton | Oct. 4, 1932 |
| 1,976,445 | Jurs | Oct. 9, 1934 |
| 2,081,056 | Loweke | May 18, 1937 |
| 2,102,834 | Carroll | Dec. 21, 1937 |
| 2,116,052 | Turpin | May 3, 1938 |
| 2,125,702 | Watson | Aug. 2, 1938 |
| 2,136,835 | Begg | Nov. 15, 1938 |
| 2,140,751 | La Brie | Dec. 20, 1938 |
| 2,189,335 | Ace | Feb. 6, 1940 |
| 2,320,585 | Gill | June 1, 1943 |

FOREIGN PATENTS

| Number | Country | Date |
|---|---|---|
| 409,828 | Germany | Feb. 13, 1925 |